(12) United States Patent
Reed et al.

(10) Patent No.: US 8,221,279 B2
(45) Date of Patent: Jul. 17, 2012

(54) DUAL APPLY CLUTCH APPARATUS FOR COMPACT ELECTRO-MECHANICAL TRANSMISSION

(75) Inventors: William S. Reed, Greenfield, IN (US); Kevin C. Beckner, Indianapolis, IN (US)

(73) Assignee: GM Global Technology Operations LLC

( * ) Notice: Subject to any disclaimer, the term of this patent is extended or adjusted under 35 U.S.C. 154(b) by 623 days.

(21) Appl. No.: 12/408,278

(22) Filed: Mar. 20, 2009

(65) Prior Publication Data

US 2009/0250307 A1 Oct. 8, 2009

Related U.S. Application Data

(60) Provisional application No. 61/042,514, filed on Apr. 4, 2008.

(51) Int. Cl.
F16H 3/44 (2006.01)
F16D 67/06 (2006.01)
(52) U.S. Cl. ........ 475/269; 475/276; 192/83; 192/85.59
(58) Field of Classification Search ............... 192/83, 192/85.49, 85.59, 85.57; 475/269, 275, 276
See application file for complete search history.

(56) References Cited

U.S. PATENT DOCUMENTS

| | | | |
|---|---|---|---|
| 5,069,657 A * | 12/1991 | Taniguchi et al. | 475/283 |
| 5,887,690 A * | 3/1999 | Haupt | 192/48.611 |
| 6,499,578 B1 * | 12/2002 | Kundermann et al. | 192/48.618 |
| 6,743,135 B2 | 6/2004 | Klemen et al. | |
| 6,758,786 B2 * | 7/2004 | Lepelletier | 475/296 |
| 6,997,640 B1 * | 2/2006 | Hohmann, Jr. | 404/67 |
| 6,997,840 B2 * | 2/2006 | Stevenson | 475/143 |
| 7,104,379 B2 * | 9/2006 | Puiu | 192/70.23 |
| 7,195,575 B2 | 3/2007 | Kempf | |
| 7,604,558 B2 * | 10/2009 | Okada et al. | 475/159 |
| 7,832,537 B2 * | 11/2010 | Blessing et al. | 192/48.91 |
| 2003/0190993 A1 * | 10/2003 | Ohkubo et al. | 475/317 |
| 2003/0224900 A1 * | 12/2003 | Sugiura et al. | 475/275 |

* cited by examiner

*Primary Examiner* — David D Le
*Assistant Examiner* — Jude Agendia (57) ABSTRACT

An actuator assembly for selectively actuating a clutch includes a first actuator ring that is moveable between a first axial position and a second axial position along a rotational axis of the clutch, and a second actuator ring that is slidably received within the first actuator ring, and that is moveable between a third axial position and a fourth axial position by the first actuator ring. The first actuator ring receives a first actuation force, and when in the second axial position, transfers the first actuation force to the second actuator ring. The second actuator ring selectively receives the first actuation force and a second actuation force, and when in the fourth axial position, transfers one of the first and second actuation forces to the clutch. The actuator assembly is included with a transmission and actuates a clutch that provides an input to a planetary gear set of the transmission.

20 Claims, 5 Drawing Sheets

DUAL APPLY CLUTCH APPARATUS FOR COMPACT ELECTRO-MECHANICAL TRANSMISSION

CROSS-REFERENCE TO RELATED APPLICATIONS

This application claims the benefit of U.S. Provisional Application No. 61/042,514, filed on Apr. 4, 2008. The disclosure of the above application is incorporated herein by reference.

FIELD

The present disclosure generally relates to power transmission devices and more particularly, to a transmission having a dual apply clutch apparatus.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Motorized vehicles may include a powertrain that includes a powerplant (e.g., an engine, an electric motor, and/or a combination thereof), a multi-speed transmission, and a differential or final drive train. The powerplant produces drive torque that is transmitted through one of various gear ratios of the transmission to the final drive train to drive wheels of the vehicle.

Hybrid powerplants may include a combination of an engine and one or more electric motors that supply drive torque to the transmission. The transmission may be an automatic transmission and may include one or more planetary gear trains for transmitting the drive torque. Planetary gear trains generally comprise a sun gear, a planetary carrier with pinion gears, and a ring gear. The sun, pinion, and ring gears are in meshing engagement and are capable of outputting several gear ratios. Planetary gear trains require two inputs to obtain a predictable gear ratio. The inputs may be selectively provided to any two of the sun gear, planetary carrier, pinion gears, and ring gear.

For example, holding the ring gear stationary while the sun gear engages with the planetary carrier produces a reduction (i.e. lower gear ratio). Alternatively, holding the sun gear stationary while the ring and planetary pinion gears mesh produces an overdrive (i.e. higher gear ratio). Additionally, holding the planetary carrier stationary while the sun, pinion, and ring gears mesh produces a reduction and a reversal of the direction of rotation.

One input may be the drive torque supplied by one or more components of the powerplant. A second input may be provided by a clutch assembly that is coupled to one of the components of the planetary gear train, typically the ring gear. The clutch assembly may input a grounding torque that inhibits rotation (e.g., hold stationary) of one of the components of the planetary gear train. The clutch assembly may include one or more actuators for grounding the clutch assemblies.

SUMMARY

The present disclosure provides an actuator assembly for selectively actuating a clutch that includes a first actuator ring that is disposed adjacent an end face of the clutch, and that is moveable between a first axial position and a second axial position along a rotational axis of the clutch, and a second actuator ring that is slidably received within the first actuator ring, and that is moveable between a third axial position and a fourth axial position along the rotational axis by the first actuator ring, wherein the first actuator ring receives a first actuation force, and when in the second axial position, transfers the first actuation force to the second actuator ring, and wherein the second actuator ring selectively receives the first actuation force and a second actuation force, and when in the fourth axial position, transfers at least one of the first and second actuation forces to the clutch.

The present disclosure also provides a clutch assembly that is supported within a case, and that includes a reaction member coupled to the case that includes a reaction plate that is interleaved with a friction plate that rotates about an axis, a first actuator ring that is slidably received within the reaction member and disposed adjacent an end face of the reaction plate, and that is moveable between a first axial position and a second axial position along the axis, and a second actuator ring that is slidably received within the first actuator ring, and that is moveable between a third axial position and a fourth axial position along the axis by the first actuator ring, wherein the first actuator ring receives a first actuation force, and when in the second axial position, transfers the first actuation force to the second actuator ring, and wherein the second actuator ring selectively receives the first actuation force and a second actuation force, and when in the fourth axial position, transfers at least one of the first and second actuation forces to the end face and thereby inhibits rotation of the friction plate.

In one feature, the reaction member and the first actuator ring define a first fluid chamber that is selectively pressurized and thereby causes the first actuator ring to move between the second axial position and the first axial position. In a related feature, the clutch assembly further includes a first bias spring that supplies the first actuation force, and that biases the first actuator ring in the second axial position. In another feature, the clutch assembly further includes a second bias spring and a piston housed within a second fluid chamber defined by the case, wherein the second bias spring biases the piston in a disengaged position corresponding to the third axial position, and wherein the second fluid chamber is selectively pressurized to provide the second actuation force and thereby move the second actuator ring between the third axial position and the fourth axial position.

In an exemplary implementation, the clutch assembly is included with a transmission that includes a first drive shaft and a second drive shaft, and a planetary gear set that selectively couples the first and second drive shafts, the third planetary gear set including a ring gear, a sun gear, and pinion gears. In the exemplary implementation, the clutch assembly selectively supplies a grounding torque to one of the ring gear, the sun gear, and the pinion gears.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 1:
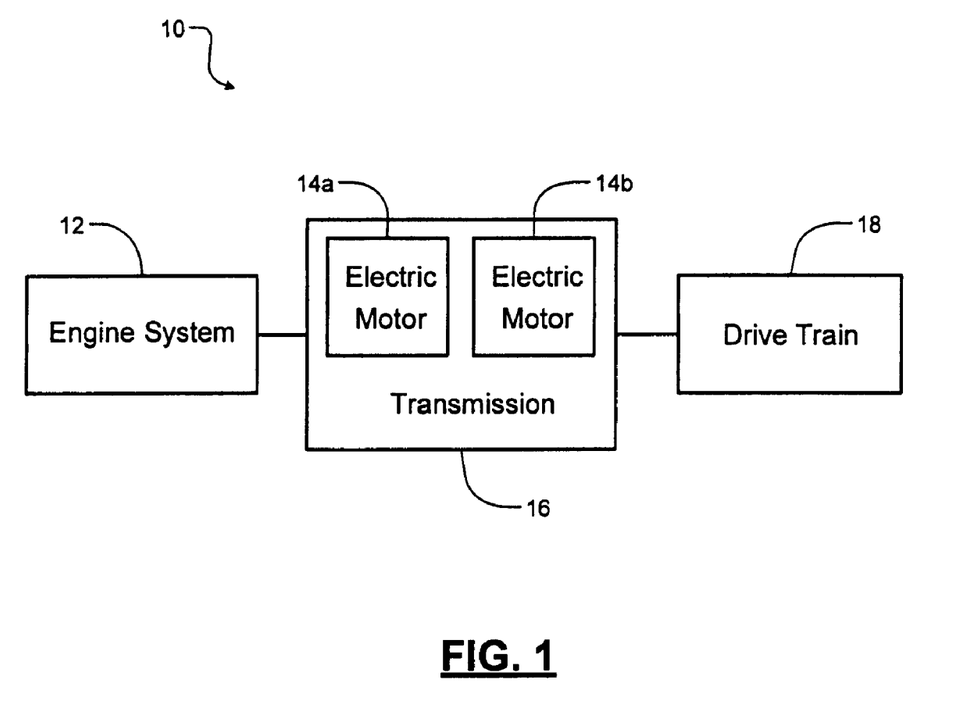
FIG. 1 is a block diagram illustrating an exemplary hybrid vehicle powertrain.

With reference to FIG. 1, a block diagram illustrating an exemplary powertrain for a hybrid vehicle is shown and generally designated by the reference numeral 10. The powertrain 10 includes an engine system 12 (e.g., internal combustion engine) and one or more electric motors 14 drivingly connected to a transmission 16. For example only, the powertrain 10 may have a single engine system 12 and two electric motors 14a, 14b as shown. The engine system 12 and electric motors 14 may be used to supply drive torque to the transmission 16. The engine system 12 and electric motors 14 may also receive torque from the transmission 16 as will be described further below.

The transmission 16 may be drivingly connected to a drivetrain 18 for driving wheels of the hybrid vehicle (not shown). Specifically, the transmission 16 may be used to transfer drive torque supplied by the engine system 12, electric motors 14, or a combination thereof, to the drivetrain 18 through one or more gear ratios of the transmission 16. The transmission 16 may also be used to transfer torque supplied by the drivetrain 18 while the vehicle is moving to the electric motors 14, engine system 12, or a combination thereof. In this manner, the electric motors 14 may be used to supply electrical power for charging an electrical system (e.g., a battery) of the vehicle. The transmission 16 may be an automatic transmission that is regulated by a powertrain control module (not shown). For example, the powertrain control module may regulate one or more actuators (e.g., fluid actuators and the like) of the transmission 16 to shift between the various gear ratios.

Figure 2:
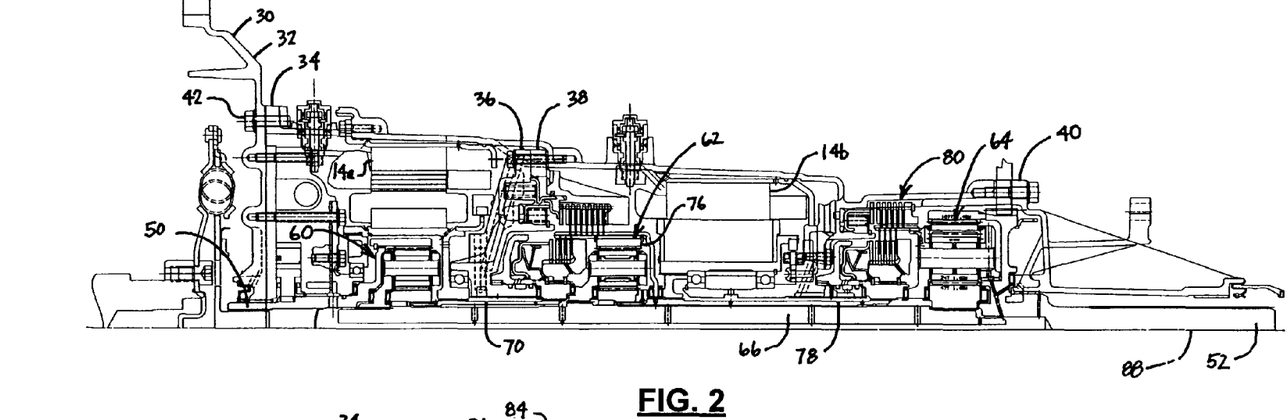
FIG. 2 is a partial cross-sectional side view of a transmission according to the principles of the present disclosure.

With reference to FIGS. 2-5, the transmission 16 will now be described in further detail. The transmission 16 includes a dual apply clutch apparatus according to the principles of the present disclosure. With particular reference to FIG. 2, the transmission 16 includes a case assembly 30 that houses the various components of the transmission 16. The case assembly 30 may be used to provide structural support for the various components of the transmission 16. The case assembly 30 may also be used to contain fluid within portions of the transmission 16 and provide passages for the transfer of pressurized fluid within the transmission 16. To these ends, the case assembly 30 may include a plurality of case sections 32, 34, 36, 38, and 40 that work together with other components of the transmission 16 for the foregoing purposes. The case sections 32-40 may be secured together by a plurality of bolts 42 as shown.

Figure 3:
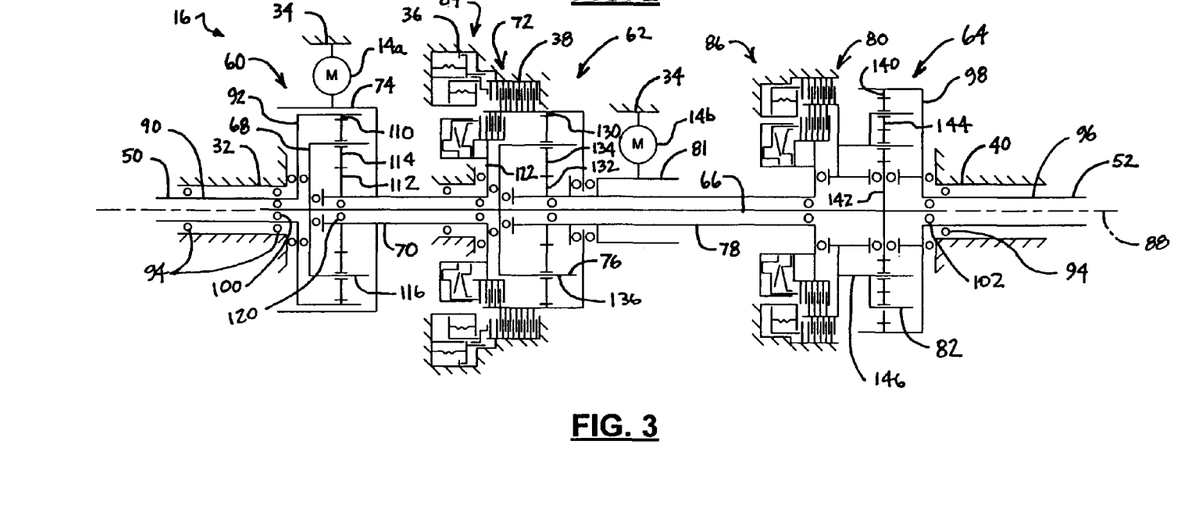
FIG. 3 is a partial mechanical schematic for the transmission shown in FIG. 2.

Referring now to FIG. 3, the transmission 16 may include an input shaft 50 connected to the electric motors 14a, 14b and an output shaft 52 through one or more gear trains. For example, the transmission 16 may include a first gear train 60, a second gear train 62, and a third gear train 64 drivingly connected by a main drive shaft 66. The first, second, and third gear trains 60, 62, 64 may be planetary gear trains (i.e. epicyclic gear trains) as shown.

Figure 4:
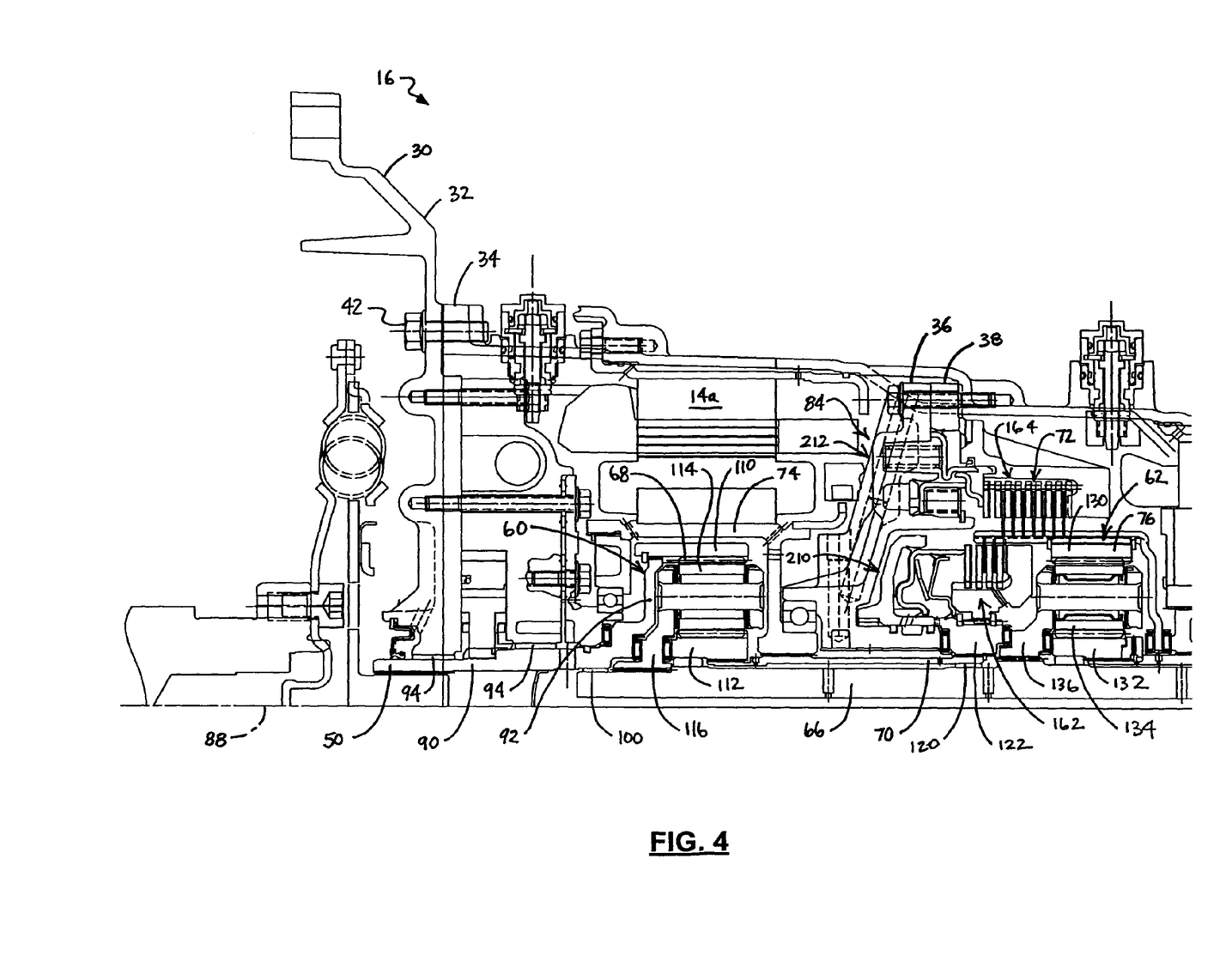
FIG. 4 is a fragmentary cross-sectional side view of the transmission shown in FIG. 2.

The first gear train 60 may include a first gear set 68 and a first drive shaft 70 coupled to a first clutch assembly 72 for selectively connecting the first gear train 60 to the second gear train 62. The first gear set 68 may be located on one end of the first drive shaft 70 and fixed for rotation with the first drive shaft 70. The first drive shaft 70 may be drivingly connected to the electric motor 14a through a rotor linkage member 74 provided with the electric motor 14a. The rotor linkage member 74 may be splined to the first drive shaft 70 as shown (FIG. 4).

Figure 5:
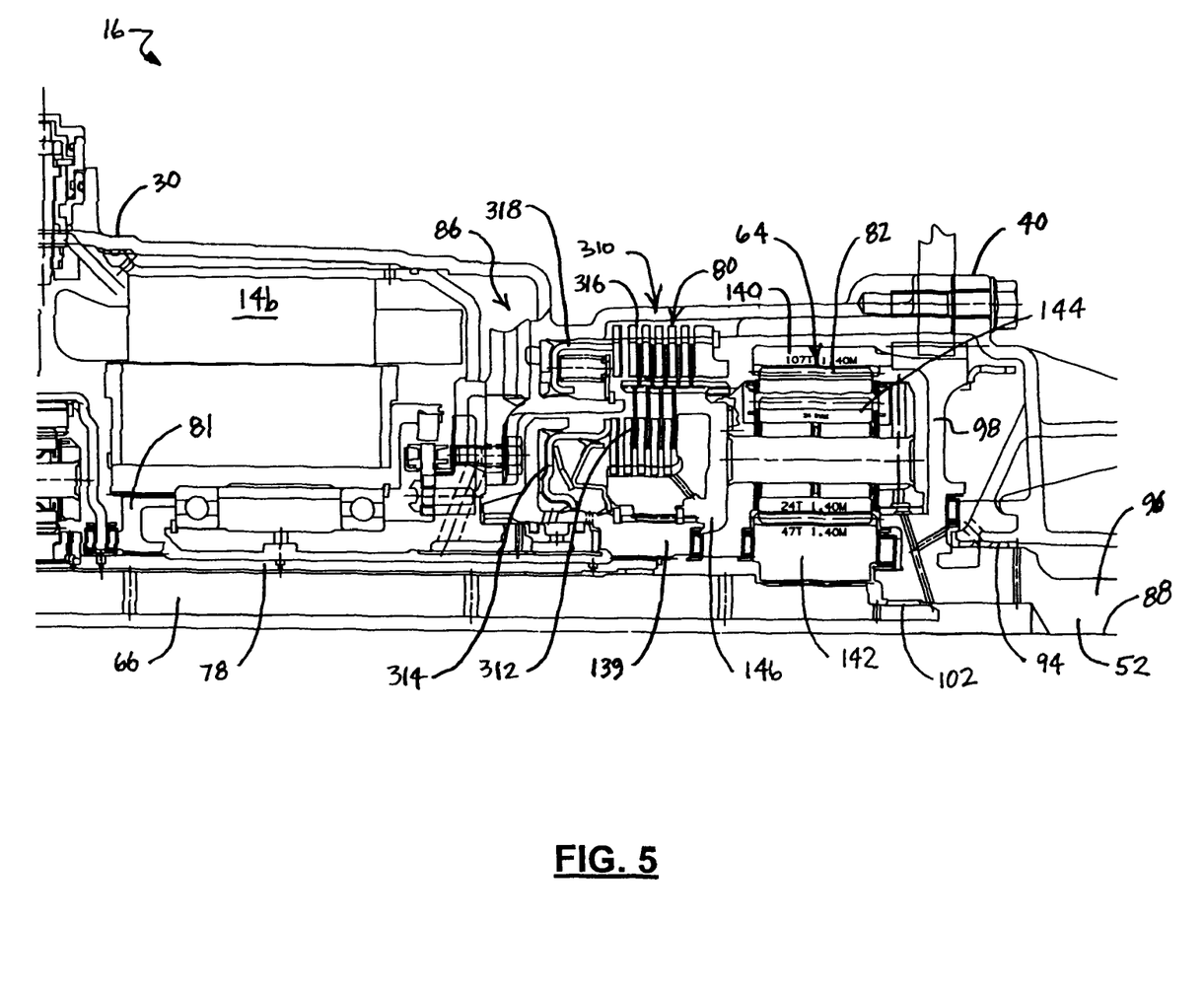
FIG. 5 is a fragmentary cross-sectional side view of the transmission shown in FIG. 2.

The second gear train 62 may include a second gear set 76 and a second drive shaft 78 coupled to a second clutch assembly 80 for selectively connecting the second gear train 62 to the third gear train 64. The second gear set 76 may be located at an end of the second drive shaft 78 and fixed for rotation with the second drive shaft 78. The second drive shaft 78 may be drivingly coupled to the electric motor 14b through a rotor linkage member 81 provided with the electric motor 14b. The rotor linkage member 81 may be splined to the second drive shaft 78 as shown (FIG. 5).

The third gear train 64 may include a third gear set 82 connected to the output shaft 52. The third gear set 82 may be located adjacent an end of the second drive shaft 78 opposite the second gear train 62 and may be selectively connected to the second gear train 62 through the second clutch assembly 80 as previously described.

The first and second clutch assemblies 72, 80 may include first and second actuator assemblies 84, 86, respectively, that selectively actuate the clutch assemblies 72, 80.

The main drive shaft 66 is fixed for rotation with the first, second, and third gear trains 60, 62, 64. The input and output shafts 50, 52, the first, second, and third gear trains 60, 62, 64, and the drive shafts 66, 70, and 78 may be coaxially aligned and fixed for rotation about an axis 88 as shown. As used hereinafter, the term axial direction generally refers to a direction parallel with axis 88. Additionally, the term radial direction will be generally used to refer to a direction normal to axis 88.

In the arrangement shown, the input shaft 50 is connected to the electric motor 14a through the first gear train 60. The input shaft 50 is connected to electric motor 14b through a combination of the first and second gear trains 60, 62 and main drive shaft 66. The input shaft 50 is connected to the output shaft 52 through a combination of the first, second, and third gear trains 60, 62, 64 and main drive shaft 66. The first and second actuator assemblies 84, 86 may selectively actuate the clutch assemblies 72, 80 and thereby operate the first, second, and third gear trains 60, 62, 64. The first and second actuator assemblies 84, 86 may operate the first, second, and third gear trains 60, 62, 64 to transfer drive torque between the input and output shafts 50, 52 and electric motors 14a, 14b at a variety of gear ratios.

While the foregoing arrangement of input and output shafts 50, 52, first, second, and third gear trains 60, 62, 64, and main drive shaft 66 is shown in the figures and will be further described herein, the principles of the present disclosure may be applied to other arrangements of the transmission 16.

With continued reference to FIG. 3, the input shaft 50 may include a tubular shaft 90 and a drum 92 fixed to one end of the tubular shaft 90. The tubular shaft 90 may extend through an opening on one end of the transmission 16 and be fixed for rotation about axis 88 through one or more journal bearings 94 provided with the case assembly 30.

The output shaft 52 may include a tubular shaft 96 and a drum 98 fixed on one end of the tubular shaft 96. The tubular shaft 96 may extend through an opening on an end of the transmission 16 opposite the input shaft 50. The tubular shaft 96 may be fixed for rotation about axis 88 within the case assembly 30 through one or more of the journal bearings 94.

The input and output shafts 50, 52 each may receive an opposite end of the main drive shaft 66 and include journal bearings 100, 102, respectively, that rotatably support the main drive shaft 66 about axis 88.

With particular reference to FIG. 4, the first gear set 68 may be of the conventional planetary type used in a power transmission and may include a ring gear 110 that circumscribes a sun gear 112 and a plurality of pinion gears 114 connected by a carrier 116. The ring gear 110 may be formed integral to the drum 92 as shown and thereby connect the input shaft 50 to the first gear train 60. The sun gear 112 may be fixed for rotation with the first drive shaft 70. For example, the sun gear 112 may be splined to the first drive shaft 70. The carrier 116 may be fixed for rotation with the main drive shaft 66 and thereby connect the main drive shaft 66 to the first gear train 60. The carrier 116 may be splined to the main drive shaft 66 as shown.

The first drive shaft 70 may have a tubular shape and have a portion of the main drive shaft 66 extending therethrough. The first drive shaft 70 may include journal bearings 120 that rotatably support a portion of the main drive shaft 66 within the first drive shaft 70. The first drive shaft 70 may further include a radially extending member 122. The member 122 may be fixed to an end of the first drive shaft 70 opposite first gear train 60 and may connect the first drive shaft 70 to the first clutch assembly 72.

The second gear set 76 may be of the conventional planetary type and may include a ring gear 130 that circumscribes a sun gear 132 and a plurality of pinion gears 134 connected by a carrier 136. The ring gear 130 may be received within and fixed for rotation with the first clutch assembly 72. The sun gear 132 may be fixed for rotation with the second drive shaft 78. For example, the sun gear 132 may be splined to the second drive shaft 78 (FIG. 4). The carrier 136 may be fixed for rotation with the main drive shaft 66 and thereby connect the main drive shaft 66 to the second gear train 62. The carrier 136 may be splined to the main drive shaft 66 (FIG. 4).

With particular reference to FIG. 5, the second drive shaft 78 may have a tubular shape and have a portion of the main drive shaft 66 extending therethrough. The second drive shaft 78 may be supported for rotation about the main drive shaft 66 by journal bearings 138. The second drive shaft 78 may include a radially extending member 139 connected to the second clutch assembly 80. The member 139 may be splined to the second drive shaft 78 as shown (FIG. 5).

The third gear set 82 may be of a conventional planetary type used in power transmissions. The third gear set 82 may include a ring gear 140 that circumscribes a sun gear 142 and a plurality of meshed pinion gear pairs 144 connected by a carrier 146. From the foregoing, it will be appreciated that the third gear set 82 differs from the first and second gear sets 68, 76 in that it includes meshed pinion gear pairs 144 disposed between the ring gear 140 and the sun gear 142, rather than a single pinion gear set (e.g., pinion gears 114, 134). The ring gear 140 may be formed integral to the output shaft 52 and thereby connect the third gear set 82 to the output shaft 52. The sun gear 142 may be fixed for rotation with the main drive shaft 66. For example, the sun gear 142 may be splined to the main drive shaft 66 (FIG. 5).

Figure 6:
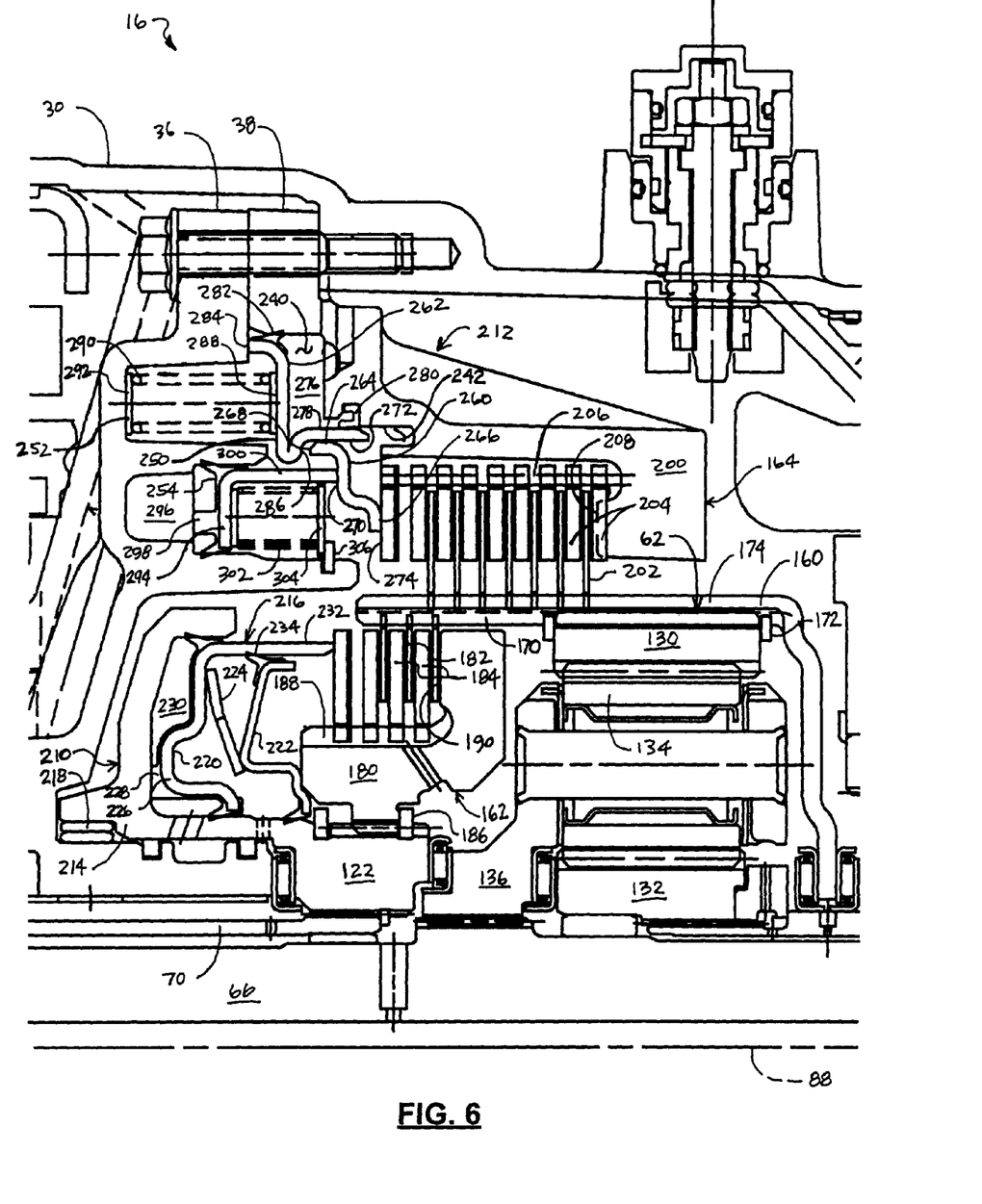
FIG. 6 is a fragmentary cross-sectional side view of a portion of the transmission shown in FIG. 4.

With particular reference to FIG. 6, the first clutch assembly 72, including the first actuator assembly 84, will now be described in detail. The first clutch assembly 72 includes a common drum 160, an inner clutch assembly 162, and an outer clutch assembly 164. The common drum 160 may receive and circumscribe the ring gear 130 and at least a portion of the inner clutch assembly 162 as shown. The common drum 160 may include a plurality of inner splines 170 located on an inner surface. The inner splines 170 may extend in a direction parallel to axis 88 and engage complementary splines provided with the ring gear 130. The common drum 160 may include a pair of snap rings 172 disposed on opposite sides of the ring gear 130 that fix the axial position of the ring gear 130 within the common drum 160. The common drum 160 may further include a plurality of outer splines 174 located on an outer surface. The outer splines 174 may extend in a direction parallel to axis 88 and engage complementary splines provided with the outer clutch assembly 164.

The inner clutch assembly 162 may include a reaction member 180 and a plurality of friction plates 182 alternately interleaved with a plurality of reaction plates 184. The reaction member 180 may be splined to member 122 and thereby be fixed for rotation with the first drive shaft 70. The reaction member 180 may have a generally L-shaped cross-section as shown and may be moveable between two axial positions along the member 122. To this end, the reaction member 180 may include a pair of snap rings 186 located on opposite sides of the reaction member 180 that engage the member 122 and thereby limit axial movement of the reaction member 180. The reaction member 180 may further include outer splines 188 and a thrust surface 190. The outer splines 188 may engage complementary splines provided with the reaction plates 184. The thrust surface 190 may be a flat surface that is generally normal to axis 88 and located adjacent to the friction plates 182 and the reaction plates 184.

The friction plates 182 may be received within and circumscribed by the common drum 160. The friction plates 182 may engage inner splines 170 and thereby be fixed for rotation with the common drum 160. The friction plates 182 may extend in a radial direction inward from the common drum 160. The reaction plates 184 may engage the outer splines 188 and thereby be fixed for rotation with the reaction member 180 and the first drive shaft 70. The reaction plates 184 may extend in a radial direction outward from the outer splines 188.

The outer clutch assembly 164 may include a reaction member 200 and a plurality of friction plates 202 alternately interleaved with a plurality of reaction plates 204. The reaction member 200 may be formed integral to the case assembly 30 (e.g. case section 38) and may include inner splines 206 and a thrust surface 208. The inner splines 206 may engage complementary splines provided with the reaction plates 204 and thereby fix the rotational position of the reaction plates 204 within the case assembly 30. The thrust surface 208 may be a flat surface that is generally normal to axis 88 and located adjacent the friction plates 202 and the reaction plates 204.

With continued reference to FIG. 6, the first actuator assembly 84 includes a first apply assembly 210, and a dual apply assembly 212 according to the principles of the present disclosure. The first apply assembly 210 is fixed for rotation with the reaction member 180 and is selectively operable to compress the friction plates 182 and the reaction plates 184 and thereby transfer torque through first clutch assembly 72.

The first apply assembly 210 may be fluid actuated and may include a piston housing 214 that works together with a piston assembly 216 to selectively apply an axial load to the reaction plates 184 and thereby actuate the inner clutch assembly 162. The piston housing 214 may be fixed to member 122 and thereby fixed for rotation with the first drive shaft 70. The piston housing 214 may be formed integral to member 122 and rotatably supported at a distal end through journal bearings 218 provided with the case assembly 30 (e.g., case section 36).

The piston assembly 216 may include a working member 220 separated from a return member 222 by a belleville spring 224. The working member 220 may include a head section 226 that is housed within the piston housing 214 and includes a stop and seal assembly 228. The head section 226 may work together with the piston housing 214 to define a fluid chamber 230. The working member 220 may further include an apply section 232 that extends between the head section 226 and the reaction plates 184. The return member 222 may be nested between the piston housing 214 and the apply section 232 as shown and abut the reaction member 180. The return member 222 may include secondary seals 234.

The belleville spring 224 works together with the return member 222 to bias the working member 220 in a first axial position in which the working member is disengaged from the inner clutch assembly 162. Pressurized fluid may be supplied to the fluid chamber 230 to move the working member 220 from the disengaged position to a second axial position in which the working member 220 is engaged with the inner clutch assembly 162 and transfers an axial load to the reaction plates 184. Pressurized fluid may be supplied by a fluid pump (not shown) included with the transmission 16.

The dual apply assembly 212 is located adjacent the outer clutch assembly 164 and may be housed within an annular cavity 240 defined by an inner wall 242 of the case assembly 30. For example, case sections 36, 38 may work together to define the annular cavity 240 as shown. The dual apply assembly 212 includes an apply arm assembly 250, a first actuator 252, and a second actuator 254. The apply arm assembly 250 is located between the outer clutch assembly 164 and the first and second actuators 252, 254. The apply arm assembly 250 is axially moveable between an engaged position and a disengaged position.

When in the engaged position, the apply arm assembly 250 transfers apply forces supplied by the first actuator 252, the second actuator 254, or a combination thereof, to the reaction plates 204. The first actuator 252 and the second actuator 254 may supply a first axial force and a second axial force, respectively, that are selectively transferred to the reaction plates 204 by the apply arm assembly 250. In the disengaged position, the apply arm assembly 250 is retracted from the outer clutch assembly 164. In this manner, the dual apply assembly 212 selectively transfers a grounding torque to the outer clutch assembly 164 and thereby inhibits rotation of the ring gear 130.

The apply arm assembly 250 includes a first apply arm 260 and a second apply arm 262. The first apply arm 260 is a generally ring-shaped member that moves along the axis 88 in response to axial forces it receives from the second actuator 254, the second apply arm 262, or a combination thereof. In particular, the first apply arm 260 moves between a retracted position in which the first apply arm 260 is disengaged from the outer clutch assembly 164 and an engaged position in which the first apply arm 260 is engaged with the outer clutch assembly 164. When in the engaged position, the first apply arm 260 transfers the apply forces it receives from the second actuator 254 and/or the second apply arm 262 to the outer clutch assembly 164. As the first apply arm 260 moves from the engaged position to the retracted position, the apply forces supplied by the second actuator 254 and/or the second apply arm 262 are released from the outer clutch assembly 164.

With continued reference to FIG. 6, the first apply arm 260 may be slidably received within the second apply arm 262 as shown. In this manner, the first apply arm 260 may be located between the outer clutch assembly 164 and both the second apply arm 262 and the second actuator 254. In the exemplary embodiment shown, the first apply arm 260 is not fixed to the second apply arm 262 or the second actuator 254. The first apply arm 260 may have a generally W-shaped cross-section having a plurality of bends. In this manner, the first apply arm 260 may be stamped from mild steel sheet metal of a suitable thickness.

The first apply arm 260 includes first and second contact surfaces 264, 266 and first and second abutment surfaces 268, 270. The first contact surface 264 is located at an outer periphery of the first apply arm 260 and slidably engages an inner surface 272 of the second apply arm 262. The first contact surface 264 and inner surface 272 may be complementary cylindrical surfaces that, when the apply arm assembly 250 is positioned within the cavity 240, may be coaxially aligned with axis 88. In this manner, the radial position of the first apply arm 260 relative to the second apply arm 262 may be fixed while allowing relative axial movement between the first and second apply arms 260, 262.

The second contact surface 266 is spaced apart from the first contact surface 264 in both a radial and an axial direction and adjoins an end face 274 of the reaction plates 204. The second contact surface 266 may be a flat annular surface that is normal to the first contact surface 264. Thus, when the apply arm assembly 250 is positioned within the cavity 240, the second contact surface 266 may be coaxially aligned with and normal to axis 88. The second contact surface 266 may be spaced radially inward of the first contact surface 264 and adjoin the reaction plates 204 such that the apply forces may be transferred evenly to the outer reaction plates 204 as the first apply arm 260 moves from the retracted position to the engaged position.

The first abutment surface 268 is located adjacent the first contact surface 264. The first abutment surface 268 receives the apply forces supplied to the second apply arm 262 by the first actuator 252 as the second apply arm 262 moves from the retracted position to the engaged position where the second apply arm 262 contacts the first apply arm 260. The first abutment surface 268 may be a generally flat surface normal to the first contact surface 264 as shown.

The second abutment surface 270 receives apply forces from the second actuator 254 as the second actuator 254 moves the first apply arm 260 from the disengaged position to the engaged position. The second abutment surface 270 may be a generally flat surface parallel to the first abutment surface 268. The second abutment surface 270 may be located at an axial and radial position between the first and second contact surfaces 264, 266 as shown.

The second apply arm 262 is a generally ring-shaped member that moves in response to axial forces it receives. In particular, the second apply arm 262 moves between a retracted position in which the second apply arm 262 is disengaged from the first apply arm 260 and an engaged position in which the second apply arm 262 is engaged with the first apply arm 260. When in the engaged position, the second apply arm 262 transfers apply forces it receives from the first actuator 252 to the first apply arm 260. As the second apply arm 262 moves from the engaged position to the retracted position, the apply forces supplied by the first actuator 252 are released from the first apply arm 260. The second apply arm 262 works together with the case assembly 30 to define a fluid chamber 276. Pressurized fluid may be supplied to the fluid chamber 276 and thereby generate an axial force that causes the second apply arm 262 to move from the engaged position into the retracted position. In particular, the axial force generated by the pressurized fluid may be greater than the first axial force supplied by the first actuator 252.

With continued reference to FIG. 6, the second apply arm 262 may have a generally Z-shaped cross-section having a plurality of bends as shown. In this manner, the second apply arm 262, like the first apply arm 260, may be stamped from mild steel sheet metal of a suitable thickness. While a Z-shaped cross-section is shown, other simpler cross-sections, such as an L-shaped cross-section are contemplated. The second apply arm 262 includes the inner surface 272 as previously described. The second apply arm 262 further includes an alignment surface 278, seals 280, 282, an end stop 284, and first and second abutment surfaces 286, 288.

The alignment surface 278 is located proximate the first apply arm 260 opposite the inner surface 272 and slidably engages a complementary portion of the inner wall 242 of the case assembly 30 (e.g., case section 38). The alignment surface 278 and complementary portion of the inner wall 242 are complementary cylindrical surfaces that, when the apply arm assembly 250 is positioned within the cavity 240, are coaxially aligned with axis 88. In this manner, the alignment surface 278 fixes the radial position of the first and second apply arms 260, 262 within the cavity 240.

Seal 280 may be included with the case assembly 30 (or reaction member 200) for sealing the second apply arm 262 on the inboard side between the alignment surface 278 and the inner wall 242. Seal 282 may be affixed to the outer periphery of the second apply arm 262 and may seal the second apply arm 262 on the outboard side. Pressurized fluid may be selectively supplied to the fluid chamber 276 to move the second apply arm 262 from the engaged position to the retracted position.

The end stop 284 is spaced apart from the alignment surface 278 in both a radial and an axial direction and abuts the inner wall 242 when the second apply arm is located at the retracted position. The end stop 284 may protrude from an end of the second apply arm 262 as shown. The end stop 284 may have a generally flat surface that is normal to the alignment surface 278. In simpler configurations, the second apply arm 262 may have a generally L-shaped cross-section in which the end stop 284 does not protrude from the end of the second apply arm 262.

The third abutment surface 286 is located adjacent the inner surface 272 and engages the first abutment surface 268 as the second apply arm 262 moves from the retracted position to the engaged position. In this manner, the third abutment surface 286 may transfer the apply forces supplied by the first actuator 252 to the first apply arm 260. The third abutment surface 286 may be a generally flat surface extending radially inward from the inner surface 272 as shown.

The fourth abutment surface 288 receives the apply forces from the first actuator 252 as the second apply arm 262 moves from the retracted position to the engaged position. The fourth abutment surface 288 may be a generally flat surface normal to the alignment surface 278.

The first actuator 252 may be located adjacent the second apply arm 262 opposite the outer clutch assembly 164 and the fluid chamber 276. The first actuator 252 may include a bias spring 290 that supplies the first axial force and biases the second apply arm 262 in the engaged position while pressurized fluid is not supplied to the fluid chamber 276 or is otherwise unavailable (e.g., while the fluid pump is not being driven). Thus, the first actuator 252 may also bias the first apply arm 260 in the engaged position and thereby cause the first axial force supplied by the bias spring 290 to be transferred to the outer clutch assembly 164. The bias spring 290 may extend in an axial direction between case assembly 30 and the fourth abutment surface 288 as shown. The bias spring 290 may be of any suitable type and may be a coil spring. The bias spring 290 may include a pair of spring seats 292 located on opposite ends.

The second actuator 254 may be fluid actuated and located adjacent the second abutment surface 270 of the first apply arm 260. The second actuator 254 may include a head section 294 that is housed within a fluid chamber 296 defined by the case assembly 30 (e.g., case section 36). The head section 294 may include a stop and seal assembly 298 affixed to the head section 294 that seals between the head section 294 and the inner wall 242. The second actuator 254 may further include an apply section 300 that protrudes from the head section 294 towards the fourth abutment surface 288. Pressurized fluid may be supplied to the fluid chamber 296 and thereby cause the apply section 300 to come into contact with the first apply arm 260 and move the first apply arm 260 from the retracted position into the engaged position. In this manner, pressurized fluid within the fluid chamber 296 may generate the second axial force that is supplied by the second actuator 254 and transferred to the outer clutch assembly 164 by the first apply arm 260.

The second actuator 254 may further include a bias spring 302 that biases the second actuator 254 at an axial position disengaged from the first apply arm 260 when pressurized fluid is not supplied to the fluid chamber 296. In this manner the apply forces generated by the second actuator 254 may be released from the first apply arm 260 and the outer clutch assembly 164. The bias spring 302 may extend in an axial direction between the head section 294 and a seat member 304. The seat member 304 may abut a snap ring 306 included with the case assembly 30.

From the foregoing, it will be appreciated that the apply forces supplied by the first and second actuators 252, 254 are selectively transferred to the outer clutch assembly 164 by the first apply arm 260. In particular, the first apply arm 260 transfers an axial force to the outer clutch assembly 164 when pressurized fluid is not supplied to the fluid chamber 276 and/or pressurized fluid is supplied to the fluid chamber 296.

Referring again to FIG. 5, the second clutch assembly 80 may include a dual clutch assembly 310 for selectively connecting the second gear train 62 to the third gear train 64 as previously described. The dual clutch assembly 310 may also selectively apply a grounding torque to the carrier 146 of the third gear set 82. For example, the dual clutch assembly 310 may include an inner clutch 312 that may be selectively actuated by an inner piston assembly 314 to connect the carrier 146 and the second drive shaft 78 as shown. The inner piston assembly 314 may have a configuration similar to the piston assembly 216 and thus will not be discussed in detail. The dual clutch assembly 310 may further include an outer clutch 316 that may be selectively actuated by an outer piston assembly 318 to ground the carrier 146 and the case assembly 30. The outer piston assembly 318 may be similar to the second actuator 254.

From the foregoing it will be appreciated that the first clutch assembly 72 disclosed herein provides a dual apply assembly 212 that contains fewer and simpler components and requires less radial packaging space within the case assembly 30. For example, the present disclosure provides a simpler case assembly 30 and apply arm assembly 250 that enable the first actuator 252 to be moved radially inward within the case assembly 30. Additionally, the present disclosure provides an apply arm assembly 250 for a dual apply clutch assembly (e.g., outer clutch assembly 164) that may be more easily manufactured and assembled to the case assembly 30. The apply arm assembly 250 is more easily manufactured using sheet metal of a suitable thickness in a stamping or other suitable forming process.

Those skilled in the art can also now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An actuator assembly for selectively actuating a clutch, the actuator assembly comprising:
   a first apply arm that is disposed adjacent to an end face of said clutch, and that is moveable between a first axial position and a second axial position along a rotational axis of said clutch; and
   a second apply arm that is slidably received within said first apply arm, and that is moveable between a third axial position and a fourth axial position along said rotational axis by said first apply arm,
   wherein said first apply arm receives a first actuation force, and when in said second axial position, transfers said first actuation force to said second apply arm by contacting said second apply arm, and
   wherein said second apply arm selectively receives said first actuation force and a second actuation force, and when in said fourth axial position, transfers at least one of said first and second actuation forces to said clutch.

2. The actuator assembly of claim 1 wherein said first and second apply arms are concentrically disposed about said rotational axis.

3. The actuator assembly of claim 1 wherein said first apply arm receives said first actuation force at a first radial location and transfers said first actuation force at a second radial location, and wherein said second apply arm transfers said at least one of said first and second actuation forces at a third radial location.

4. The actuator assembly of claim 3 wherein said second radial location is inward of said first radial location and said third radial location is inward of said first and second radial locations.

5. A clutch assembly supported within a case, the clutch assembly comprising:
   a reaction member coupled to said case that includes a reaction plate that is interleaved with a friction plate that rotates about an axis;
   a first apply arm that is slidably received within said reaction member and disposed adjacent an end face of said reaction plate, and that is moveable between a first axial position and a second axial position along said axis; and
   a second apply arm that is slidably received within said first apply arm, and that is moveable between a third axial position and a fourth axial position along said axis by said first apply arm,
   wherein said first apply arm receives a first actuation force, and when in said second axial position, transfers said first actuation force to said second apply arm by contacting said second apply arm, and
   wherein said second apply arm selectively receives said first actuation force and a second actuation force, and when in said fourth axial position, transfers at least one of said first and second actuation forces to said end face and thereby inhibits rotation of said friction plate.

6. The clutch assembly of claim 5 wherein said first and second apply arms are concentrically disposed about said axis.

7. The clutch assembly of claim 5 wherein said first apply arm receives said first actuation force at a first radial location and transfers said first actuation force at a second radial location, and said second apply arm transfers said at least one of said first and second actuation forces at a third radial location.

8. The clutch assembly of claim 7 wherein said first apply arm has an L-shaped cross-section that defines a first contact surface that receives said first actuation force and a second contact surface opposite said first contact surface that abuts said second apply arm when said first apply arm is in said second axial position.

9. The clutch assembly of claim 8 wherein said first apply arm is formed from a piece of sheet metal.

10. The clutch assembly of claim 8 wherein said second apply arm has a W-shaped cross-section that defines a first contact surface that receives said first actuation force, a second contact surface that receives said second actuation force, and a third contact surface that abuts said end face when said second apply arm is in said fourth axial position.

11. The clutch assembly of claim 10 wherein said second apply arm is formed from a piece of sheet metal.

12. The clutch assembly of claim 5 wherein said reaction member and said first apply arm define a first fluid chamber that is selectively pressurized and thereby causes said first apply arm to move between said second axial position and said first axial position.

13. The clutch assembly of claim 12 wherein said first apply arm further includes a first seal affixed to an outer periphery that seals said first fluid chamber between said first apply arm and said reaction member.

14. The clutch assembly of claim 13 wherein said reaction member further includes a second seal that seals said first fluid chamber between said reaction member and said first apply arm.

15. The clutch assembly of claim 12 further comprising a first bias spring that supplies said first actuation force, and that biases said first apply arm in said second axial position.

16. The clutch assembly of claim 15 further comprising a second bias spring and a piston housed within a second fluid chamber defined by said case, wherein said second bias spring biases said piston in a disengaged position corresponding to said third axial position, and wherein said second fluid chamber is selectively pressurized to provide said second actuation force and thereby move said second apply arm between said third axial position and said fourth axial position.

17. A clutch assembly for selectively coupling a first drive shaft and a second drive shaft, the clutch assembly comprising:
   a first clutch that is received within a drum and includes a first friction plate fixed for rotation with said drum about an axis, and that is selectively actuated by a first clutch actuator to drivingly couple said first drive shaft and said drum;
   a second clutch that circumscribes said drum and includes a second friction plate fixed for rotation with said drum, and that is selectively actuated to couple a case and said drum; and a second clutch actuator that is disposed within said case radially outward of said first clutch actuator, and that selectively actuates said second clutch, said second clutch actuator including:
- a first actuator that selectively supplies a first actuation force in a direction parallel to said axis,
- a second actuator that selectively supplies a second actuation force in a direction parallel to said axis,
- a first apply arm that is disposed adjacent an end face of said second clutch about said axis, and that is moveable between a first axial position and a second axial position; and
- a second apply arm that is disposed adjacent said end face and slidably received within said first apply arm, and that is moveable between a third axial position and a fourth axial position by said first apply arm, wherein said first apply arm receives said first actuation force at a first radial location and transfers said first actuation force to said second apply arm at a second radial location when in said second axial position, and wherein said second apply arm receives said first and second actuation forces and transfers at least one of said first and second actuation forces to said second clutch at a third radial location when in said fourth axial position.

18. The clutch assembly of claim 17 wherein an innermost surface of said second clutch actuator is disposed radially outward of an outermost surface of said first clutch actuator.

19. The clutch assembly of claim 17 wherein said first clutch actuator and said second clutch actuator are concentrically located about said axis.

20. A transmission comprising:
- a first drive shaft and a second drive shaft;
- a planetary gear set that selectively couples said first and second drive shafts, said planetary gear set including a ring gear, a sun gear, and pinion gears; and
- the clutch assembly of claim 5, wherein said clutch assembly selectively supplies a grounding torque to one of said ring gear, said sun gear, and said pinion gears.

* * * * *